United States Patent [19]

Jejelowo et al.

[11] Patent Number: 5,281,679
[45] Date of Patent: Jan. 25, 1994

[54] CATALYST AND METHOD OF BROADENING POLYMER MOLECULAR WEIGHT DISTRIBUTION AND INCREASING POLYMER TENSILE IMPACT STRENGTH AND PRODUCTS MADE THEREOF

[75] Inventors: Moses O. Jejelowo, Kingwood; Robert L. Bamberger, Crosby, both of Tex.

[73] Assignee: Exxon Chemical Patents Inc., Linden, N.J.

[21] Appl. No.: 865,579

[22] Filed: Apr. 9, 1992

Related U.S. Application Data

[63] Continuation-in-part of Ser. No. 788,972, Nov. 7, 1991, abandoned.

[51] Int. Cl.$^5$ ............................ C08F 2/34; C08F 4/64
[52] U.S. Cl. ................................... 526/114; 526/113; 526/118; 526/119; 526/127; 526/160; 526/348.6; 526/352; 502/113; 502/152

[58] Field of Search .............. 526/160, 113, 114, 118, 526/119, 127

[56] References Cited

U.S. PATENT DOCUMENTS

| | | | |
|---|---|---|---|
| 4,894,734 | 10/1989 | Kioka et al. | 502/104 |
| 4,897,455 | 1/1990 | Welborn, Jr. | 526/160 |
| 4,935,474 | 6/1990 | Ewen et al. | 526/160 |
| 4,937,301 | 6/1990 | Chang | 526/128 |
| 5,132,262 | 7/1992 | Rieger et al. | 526/160 |

Primary Examiner—Joseph L. Schofer
Assistant Examiner—David Wu
Attorney, Agent, or Firm—Jaimes Sher

[57] ABSTRACT

A catalyst and method of producing polyolefins having broadened molecular weight distributions and enhanced tensile impact strengths utilizing a silica supported metallocene-alumoxane catalyst system, wherein at least one of the metallocenes has at least one cyclopentadienyl ring being substituted by at least one optionally substituted hydrocarbon substituent having a 2° or 3° carbon atom with which it is covalently bonded to the cyclopentadienyl ring.

18 Claims, 5 Drawing Sheets

1H NMR (400MHz) OF BIS (i-PROPYLCYCLOPENTADIENYL) ZIRCONIUM DICHLORIDE

1H NMR (400MHz) OF BIS (t-BUTYLCYCLOPENTADIENYL) ZIRCONIUM DICHLORIDE

CATALYST AND METHOD OF BROADENING POLYMER MOLECULAR WEIGHT DISTRIBUTION AND INCREASING POLYMER TENSILE IMPACT STRENGTH AND PRODUCTS MADE THEREOF

BACKGROUND OF THE INVENTION

This application is a continuation-in-part application of U.S. patent application Ser. No. 788,972, filed Nov. 7, 1991 now abandoned.

1. Field of the Invention

This invention relates to catalysts, to methods of olefin polymerization, to polymers, and to products made thereof. This invention particularly relates to a catalyst and method of broadening the molecular weight distribution of a polymer product by controlling the chemistry of the polymerization catalyst. In another aspect this present invention relates to a catalyst and a method of increasing the tensile impact strength and impact resistance of a polymer product by controlling the chemistry of the polymerization catalyst.

2. Description of the Related art

Conventional Ziegler-Natta catalysts typically produce polyolefins of broad molecular weight distributions. The Ziegler-Natta catalyst was introduced to the art in the 1950's as a hydrocarbon insoluble complex of a transition metal compound, conventionally $TiCl_3$, and an alkyl aluminum, particularly trialkylaluminum. Efforts to produce a Ziegler-Natta catalyst in a hydrocarbon soluble form led to the development of the metallocene-alumoxane catalyst system. Unlike a conventional Ziegler-Natta catalyst, a metallocene-alumoxane catalyst is single-sited and therefore produces polyolefins which typically have a narrow molecular weight distribution.

Olefin polymerization catalysts comprising a metallocene and an aluminum alkyl component were first proposed in about 1956. Australian patent 20436 proposed for use as a polymerization catalyst a bis-(cyclopentadienyl) titanium, zirconium, or vanadium salt reacted with various aluminum alkyl compounds. Although such catalyst complexes are useful for polymerization of ethylene, such catalytic complexes, especially those made by reaction with an aluminum trialkyl, had an insufficient level of catalytic activity to be employed commercially for production of polyethylene or copolymers of ethylene.

Later it was found that certain metallocenes such as bis-(cyclopentadienyl) titanium, or zirconium dialkyls in combination with an aluminum alkyl/water cocatalyst form catalyst systems for the polymerization of ethylene. Such catalysts have sufficient activity to be commercially useful and enable the control of polyolefin molecular weight by means other than hydrogen addition—such as by controlling the reaction temperature or by controlling the amount of cocatalyst, alumoxane, which is produced by the reaction of water with an aluminum alkyl.

To realize the benefits of such a catalyst system, one must use or produce the required alumoxane cocatalyst component. As previously discussed above, an alumoxane is produced by reacting an aluminum alkyl with water. This reaction of an aluminum alkyl with water is very rapid and highly exothermic and because of the pyroforic nature of this reaction, alumoxane as a cocatalyst component heretofore has been separately prepared by one of two general methods. Alumoxanes may be prepared by adding extremely finely divided water, such as in the form of a humid solvent, to a solution of aluminum alkyl in benzene, other aromatics, or aliphatic hydrocarbons. The production of alumoxane by such procedures requires the use of explosion-proof equipment and extreme care in monitoring reaction conditions in order to reduce potential fire and explosion hazards. For this reason, it has been preferred to produce alumoxane by reacting aluminum alkyl with a hydrated salt, such as hydrated copper sulfate.

Several commonly-owned U.S. patents have addressed the above problems in the prior art, for example U.S. Pat. Nos. 4,912,075, 4,937,301, 4,925,821, 4,937,217, 4,935,397 and 5,006,500. The aformentioned U.S. patents are hereby incorporated by reference. Such as U.S. Pat. No. 5,006,500 describe procedures by which an alumoxane is safely produced directly on a silica support by reacting an alkyl aluminum with water-containing silica. Such alumoxane-silica product is then reacted with a metallocene to yield a supported metallocene-alumoxane catalyst useful in the polymerization of olefins.

The molecular weight distribution (MWD), i.e. $M_w/M_n$, of polyethylenes produced by homogeneous catalysts comprising titanium and zirconium metallocenes are typically narrow. Hence, the above listed references neither disclose polyethylenes having broad molecular weight distributions nor how to obtain such polyethylenes. Although there are many applications for polyolefins having a narrow molecular weight distribution as a desirable property, i.e. to ease the processability of polyolefins into finished form, it is often desirable to have a polyolefin with a broader molecular weight distribution.

A method of broadening the molecular weight distribution of polyolefins has long been desired by and needed in industry. For many applications, such as extrusion and molding processes, it is highly desirable to use polyolefins which have a broad molecular weight distribution. Such polymers evidence excellent processability, i.e., they can be processed faster with a lower energy requirement. At the same time such polymers exhibit reduced melt flow perturbations.

In addition, a method of increasing the tensile impact strength of polyolefins while maintaining processability has long been desired by and needed in industry. Such a polymer with a balance of strength and processability could be utilized for manufacturing molded and film products which are stronger than the prior art materials while requiring the same processing energy or cycle time, or could be utilized for manufacturing molded and film products which are as strong as the prior art materials with less processing energy or cycle time.

Several prior art methods have been directed toward making broader molecular weight distribution polyolefins.

U.S. Pat. No. 4,310,648 discloses a catalytic reaction product of a titanium compound, a zirconium compound, an organomagnesium compound and a halide source. The reaction product (a heterogeneous catalyst), when employed in combination with aluminum alkyl, is useful for the production, at high activity, of broad molecular weight polyethylenes.

U.S. Pat. No. 4,361,685 discloses the use of organic soluble chromium and zirconium compounds employed in combination with a supported catalyst system comprising an organometallic activating agent and a trivalent or tetravalent titanium compound. The polymers obtained have a high molecular weight and a narrow molecular weight distribution.

In "Molecular Weight Distribution And Stereoregularity Of Polypropylenes Obtained With Ti(OC$_4$H$_9$-)$_4$Al$_2$(C$_2$H$_3$)$_3$ Catalyst System"; Polymer. Pg. 469-471, 1981, Vol. 22, April, Doi, et al. disclose propylene polymerization with a catalyst, which at about 41° C. obtains a soluble catalyst and an insoluble catalyst fraction, one with "homogeneous catalytic centres" and the other with "heterogeneous catalytic centres". The polymerization at that temperature obtains polypropylene having a bimodal molecular weight distribution. Also, U.S. Pat. No. 4,931,417 describes the use of bis(methyl-t-butyl cyclopentadienyl) zirconium dichloride to obtain atactic polypropylene.

U.S. Pat. No. 4,935,474 discloses a method of obtaining polyethylene having a broad molecular weight distribution utilizing a catalyst comprising (a) at least two different metallocenes each having different propagation and termination rate constants for ethylene polymerizations and (b) an alumoxane.

U.S. Pat. No. 4,808,561 discloses metallocene polymerization catalyst having cyclopentadienyl rings substituted with hydrocarbyl groups such as alkyl, aryl, alkylaryl, or arylalkyl groups. However, this patent does not teach a method of making broader molecular weight distribution polyolefins.

In spite of the prior art methods for polymerizing broader molecular weight distribution polyolefins, there still exists a need in the art for an improved catalyst and a method of making high quality polyolefins having a broad molecular weight distribution utilizing a simple catalyst system not requiring two or more transition metals.

In addition to the need for providing broader molecular weight distribution polyolefins, there also exists a need in the art for an improved catalyst and method of making high quality polyolefins having improved tensile impact strength while maintaining processability ease.

SUMMARY OF THE INVENTION

The present invention is directed toward a catalyst and process for producing homopolymers or copolymers having a broadened molecular weight distribution. The present invention is also directed toward a catalyst and process for producing homopolymers or copolymers having an improved tensile impact strength. Both of these are accomplished by polymerizing alpha-olefin monomers, optionally with co-monomer in the presence of a catalyst system.

The catalyst system comprises (i) a metallocene having at least one cyclopentadienyl ring being substituted by at least one hydrocarbon substituent having a 2° (secondary) or 3° (tertiary) carbon atom and said hydrocarbon substituent is covalently bonded to said at least one cyclopentadienyl ring at said 2° or 3° carbon atom; and (ii) an alkylaluminum and water or reaction products thereof, or combinations thereof. This process is completed by collecting the desired polymer.

By practicing the process of this present invention, ethylene is polymerized to produce high molecular weight polyethylenes such as linear low density polyethylene (LLDPE) and high density polyethylene (HDPE) polymers having broadened molecular weight distributions and improved tensile impact strengths.

The polymers are intended for fabrication into articles by, for example, extrusion, injection molding, thermoforming, rotational molding, and the like.

According to one embodiment of the present invention, at least one monomer of an alpha-olefin is polymerized, preferably in, but not limited to, a gas-phase reactor, in the presence of a silica gel supported catalyst system comprising at least one metallocene selected from metallocenes of the Group IVB or Group VB metals of the Periodic Table of Elements. The process of this invention is suitable for use in slurry or solution reactors with an unsupported or a supported catalyst system. The broadening of the molecular weight distribution and the increase in the tensile impact strength is accomplished by the presence of at least one metallocene which has at least one cyclopentadienyl ring which is substituted with hydrocarbyl or substituted hydrocarbyl substituent having a 2° or 3° carbon atom, which is covalently bonded to the cyclopentadienyl ring through the 2° or 3° carbon atom of the substituent. In a preferred embodiment of the present invention, the molecular weight distribution broadening substituent or the tensile impact strength increasing substituent on the cyclopentadienyl ring is an alkyl having about 3 to about 20 carbon atoms and has a 2° or 3° carbon atom with which it is covalently bonded to at least one cyclopentadienyl ring. Exemplary examples of the molecular weight distribution broadening or impact strength increasing substituent include propyl, butyl, and 2° pentyl substituent groups. These exemplary examples are not intended to limit the substituent, which can be any hydrocarbon substituent having a 2° or 3° carbon atom.

DETAILED DESCRIPTION OF THE INVENTION

Catalyst Component-Activator

Alumoxane

Figure 1:
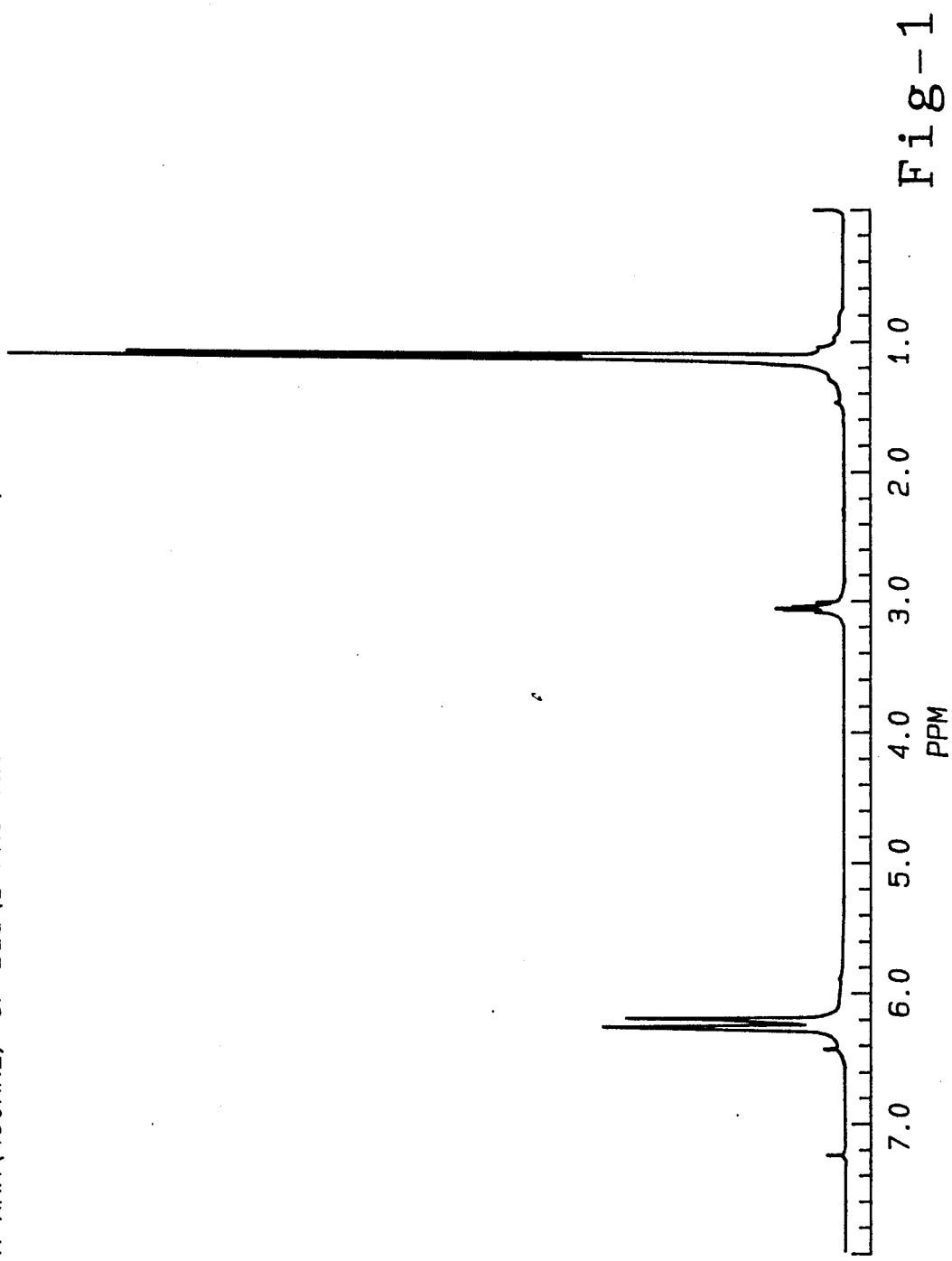
FIG. 1 is a $^1$H NMR(400MHz) trace for (i-PrCp)ZrCl$_2$ showing the methyl protons of the i-propyl at about 1.20 ppm, the methine proton of the i-propyl at about 3.1 ppm, and showing the protons of the Cp ring at about 6.2 ppm.

The active catalyst complex system of the present invention may also include a metallocene and an alumoxane cocatalyst formed on the surface of a silica gel which then serves as support material.

While not wishing to be bound by theory, it is believed that alumoxanes appear to be oligomeric aluminum compounds represented by the general formula —(R—Al—O)$_y$, which may be a cyclic compound and R(R—Al—O—)$_y$AlR$_2$, which may be a linear compound. In the general formula, "R" is a C$_1$-C$_{10}$ alkyl group such as, for example, methyl, ethyl, propyl, butyl, and pentyl and "y" is an integer from 2 to about 30 and represents the degree of oligomerization in the alumoxane. Preferably, R is methyl, and the degree of oligomerization, "y," is about 4 to about 25 and most preferably 6–25. Generally, in the preparation of alumoxanes from, for example, the reaction of methyl aluminum and water, it is believed that a mixture of linear and cyclic compounds is obtained. Generally, an alumoxane having a higher degree of oligomerization will, for a given metallocene, produce a catalyst complex of a higher activity than will an alumoxane having a lower degree of oligomerization. Hence, the procedure by which alumoxane is produced by direct reaction of a alkyl aluminum with an undehydrated silica gel should ensure the conversion of a bulk quantity of the alkyl aluminum to an alumoxane that has a high degree of oligomerization. In accordance with this invention, the desired degree of oligomerization is obtained by the order of addition of reactants as described hereinafter. Whatever species actually results within the material which, for the purposes of this invention, is called alumoxane; it is known that the combination of alkylaluminum with water, or in some cases, hydroxyl groups, as supplied by alcohol, hydrated materials or bases, result in a mixture which will be effective in the practice of this invention.

Ionic Activator

In copending U.S. Pat. Application Ser. Nos. 133,480, filed Dec. 22, 1987 and 133,052, filed Dec. 21, 1987, herein incorporated by reference, new metallocene based catalyst systems are disclosed. Where before a metallocene was activated to a catalytic state by reacting the metallocene with a conventional Ziegler-Natta cocatalyst, namely a trialkylaluminum, or by reacting the metallocene with an alumoxane. In the new catalyst systems of copending Ser. Nos. 133,480 and 133,052 an ionic compound is reacted with the metallocene to form the catalyst system. The ionic activator compound for the catalyst system comprises a cation and an anion, the cation being one which is reactable with a non-cyclopentadienyl ligand of the metallocene to yield as the reaction product a neutral ligand derivative, and a cationic metallocene species to which the anion of the activator compound is essentially non-coordinating. The cationic metallocene as associated with the non-coordinating anion is the catalytically active species of the system. In Ser. No. 133,052, the activator compound is comprised of a cation and an anionic carborane whereas in Ser. No. 133,480 the ion-exchange activator compound is comprised of a cation and an anionic coordination complex. The cation of the ion-exchange reagents described in the copending patent applications can in general be any cationic species which is capable of reacting with a negatively charged ligand on the transition metal precursor. When the ligand on the transition metal precursor is an alkyl, then cations known to abstract alkyls from early transition metal complexes can be used such as triphenylcarbonium, oxonium, silver (I), and ammonium. The preferable ion-exchange activators described in Ser. No. 133,480 are comprised of an acidic ammonium cation and an anionic coordination complex derived from boron having the general formula [LH]$^+$[BArAr'XX'] wherein [LH]$^+$ is a protonated tertiary amine, L is a tertiary amine, Ar, Ar', X, X' are aromatic hydrocarbyl radicals and X and X' may be hydride, halide or hydrocarbyl radicals. As described in copending U.S. patent application Ser. No. 555,977, filed Jul., 19, 1990, and herein incorporated by reference, the chemical structure of the catalytically active species is dependent upon the nature of the cation employed in the activator compound and upon the stoichiometric proportions in which the metallocene and activator compound are reacted. In some instances, the metallocene cation generated by the reaction exists as a three coordinate species, ACpZX$_1$+ (where ACp represents two cyclopentadienyl ligands which are bridged or unbridged, the same or different, Z is a Group IVB metal, and X$_1$ is selected from the group consisting of hydride, aryl, hydrocarbyl, halocarbyl, or organic derivatives of organometalloid radicals), although it is possible that the four coordinate species ACpZX$_1$(L)$^+$ (where L is a neutral Lewis base such as tertiary amine or metallocene) can form via the labile coordination thereto of the neutral Lewis base by-product or via a dimeric coordination to a neutral as yet unreacted metallocene. In both forms the metallocene cation is stabilized by ionic association to the non-coordinating anion provided by the activator compound while the neutral coordination ligand, either the neutral Lewis base by-product or a neutral metallocene dimerizing ligand are very labile to displacement by an olefin or other polymerizable monomer.

The new catalyst systems as described by copending U.S. patent application Ser. Nos. 133,480; 133,052 and 555,977 are very active for the production of polyolefins without the need to employ quantities of activator compounds in excess of a stoichiometric ratio to the metallocene of 1:1.

As noted, the new ionically activated metallocene catalyst systems are soluble, i.e. homogeneous, systems. As disclosed in copending U.S. patent application Ser. No. 459,921, filed Jan. 2, 1990 and herein incorporated by reference, these ionically activated metallocene catalysts can be produced in a heterogeneous, i.e., supported, form by physical absorption or adsorption of the components thereof onto suitable inorganic oxide support particles.

Catalyst Component-Metallocene

The metallocene utilized in the process of the present invention may be any of the organometallic coordination compounds obtained as a cyclopentadienyl derivative of the Group IVB and/or Group VB transition metals. Metallocenes which are useful for preparing an active catalytic complex according to the process of this invention are the mono, bi and tri cyclopentadienyl metal compounds and most preferably, bis-cyclopentadienyl compounds. Also suitable are bridged cyclopentadienyl compounds. In addition, the metallocenes of the present invention have at least one cyclopentadienyl ring which is substituted with a hydrocarbyl or substituted hydrocarbyl substituent having a 2° or 3° carbon atom, which is covalently bonded to the cyclopentadienyl ring through the 2° or 3° carbon atom. Preferred metallocenes are the bis(cylcopentadienyl) Group IVB transition metal compounds wherein at least one of the cyclopentadienyl groups is substituted with a hydrocarbyl group by covalent bonding through its 2° or 3° carbon atom.

Examples of such metallocenes particularly useful in this invention are represented by the general formulas:

$$(C_5R'_k)_g R''_s (C_5R'_k) MQ_{3-g}, \qquad (I)$$

and $$R''_s (C_5R'_k)_2 MQ' \qquad II.$$

wherein $(C_5R'_k)$ is a substituted cyclopentadienyl, M is a Group IVB or VB transition metal and preferably, a Group IVB transition metal, each R' group is the same or different and is an optionally substituted hydrocarbon group with at least one R' in the metallocene compound being a molecular weight distribution broadening hydrocarbyl substituent comprising a 2° or 3 carbon atom with which it is bonded to the cyclopentadienyl group with the remainder R' groups being hydrogen or hydrocarbyl radical such as alkyl, alicyclic, aryl, alkylaryl, or arylalkyl radicals containing from 1 to 20 carbon atoms, a silicon-containing hydrocarbyl radical, or a hydrocarbyl radical wherein two carbon atoms are joined together to form a $C_4-C_6$ ring, R'' is $C_1-C_4$ alkylene radical, a dialkyl germanium or silicon, or an alkyl phosphine or amine radical bridging any one pair of the $(C_{5'k})$ rings, Q is a hydrocarbyl radical such as aryl, alkyl, alicyclic, alkenyl, alkylaryl, or arylalkyl having 1-20 carbon atoms, hydrocarboxyl radical having 1-20 carbon atoms or halogen and can be the same or different, Q' is an alkylidene radical having from 1 to about 20 carbon atoms, s is 0 or 1, g is 0, 1 or 2; when g is 0, s is 0; k is 4 when s is 1 and k is 5 when s is 0 and M is as defined above.

Exemplary hydrocarbyl radicals are methyl, ethyl, propyl, butyl, amyl, isoamyl, hexyl, cyclohexyl, isobutyl, heptyl, octyl, nonyl, decyl, cetyl, ethylhexyl, phenyl, and the like. Exemplary alkylene radicals are methylene, ethylene, propylene, and the like. Exemplary halogen atoms include chlorine, bromine and iodine and of these halogen atoms, chlorine is preferred. Exemplary alkylidene radicals are methylidene, ethylidene and propylidene.

Of the metallocenes, hafnocenes, zirconocenes and titanocenes are most preferred.

Examples of suitable preferred bis(cylcopentadienyl) Group IVB transition metal compounds wherein at least one of the cyclopentadienyl groups is substituted with a hydrocarbyl group covalently bonded at a 2° or 3° carbon atom of the hydrocarbyl group, are represented by the following general formulas:

$$(A-Cp)MX_1X_2 \qquad III$$

$$(A-CP)MX'_1X'_2 \qquad IV$$

$$(A-Cp)MJ \qquad V$$

$$(Cp^*)(CpR)MX_1 \qquad VI$$

wherein "Cp" represents a cyclopentadienyl radical which may be substituted or unsubstituted, and:
(A-Cp) is either $(Cp)(Cp^*)$ or $Cp-A_r-Cp^*$ and Cp and $Cp^*$ are the same or different cyclopentadienyl ring substituted with from one to five substituent R groups, with at least one R group on the metallocene compound being a molecular weight distribution broadening or tensile impact strength enhancing substituent comprising a 2° or 3° carbon atom with which it is bonded to the cyclopentadienyl group with each remainder R group is, independently, a radical which can be hydrocarbyl, halocarbyl, substituted halocarbyl, hydrocarbyl-substituted organometalloid, or halogen, or Cp and Cp* are a cyclopentadienyl ring, with at least one R group on the metallocene compound being a molecular weight distribution broadening or tensile impact strength enhancing substituent comprising a 2° or 3° carbon atom with which it is bonded to the cyclopentadienyl ring, and in which two adjacent R groups are joined forming a $C_4$ to $C_{20}$ ring to give a saturated or unsaturated polycyclic cyclopentadienyl ligand such as indenyl, tetrahydroindenyl, fluorenyl, or octahydrofluorenyl and A, is a covalent bridging group which restricts rotation of the two Cp-groups, M is titanium, zirconium or hafnium; J is an olefin, diolefin or aryne ligand; $X_1$ and $X_2$ are, independently, selected from the group consisting of hydride radicals, hydrocarbyl radicals having from 1 to about 20 carbon atoms, substituted-hydrocarbyl radicals having from 1 to about 20 carbon atoms, wherein one or more of the hydrogen atoms are replaced with a halogen atom, organometalloid radicals comprising a Group IV-A element wherein each of the hydrocarbyl substitutions contained in the organic portion of said organometalloid, independently, contain from 1 to about 20 carbon atoms and the like; $X'_1$ and $X'_2$ are joined and bound to the metal atom to form a metallacycle, in which the metal atom, $X'_1$, and $X'_2$ form a hydrocarbocyclic ring containing from about 3 to about 20 carbon atoms; and R is a substituent, preferably a hydrocarbyl substituent, on one of the cyclopentadienyl radicals which is also bound to the metal atom.

Each carbon atom in the cyclopentadienyl radical ("Cp") may be, independently, unsubstituted or substituted with the same or a different radical selected from the group consisting of hydrocarbyl radicals, substituted-hydrocarbyl radicals wherein one or more hydrogen atoms is replaced by a halogen atom, hydrocarbyl radicals in which adjacent substituents are joined to form a ring of 4 to 10 or more carbon atoms, hydrocarbyl-substituted metalloid radicals wherein the metalloid is selected from Group IV-A of the Periodic Table of the Elements, and halogen radicals. Suitable hydrocarbyl and substituted-hydrocarbyl radicals, which may be substituted for at least one hydrogen atom in a cyclopentadienyl radical, contain from 3 to about 20 carbon atoms and include straight and branched alkyl radicals, cyclic hydrocarbon radicals, alkyl-substituted cyclic hydrocarbon radicals, aryl substituted radicals and alkyl aryl-substituted radicals. Similarly, and when $X_1$ and/or $X_2$ is a hydrocarbyl or substituted-hydrocarbyl radical, each may, independently, contain from 3 to about 20 carbon atoms and be a straight or branched alkyl radical, a cyclic hydrocarbyl radical, an alkyl-substituted cyclohydrocarbyl radical, an aryl radical or an alkyl-substituted radical. Suitable organometalloid radicals include mono-, di- and trisubstituted organometalloid radicals of Group IV-A elements wherein each of the hydrocarbyl groups contain from 3 to about 20 carbon atoms. More particularly, suitable organometalloid radicals include trimethylsilyl, triethylsilyl, ethyldimethylsilyl, methyldiethylsilyl, triphenylgermyl, trimethylgermyl and the like.

Molecular Weight Distribution Broadening or Tensile Impact Strength Enhancing Substituent Substituents suitable as the molecular weight distribution broadening or tensile impact strength enhancing substituent are generally any substituted hydrocarbon having from about 3 to about 20 carbon atoms and comprising a 2° or 3° carbon atom with which it is covalently bonded to the cyclopentadienyl ring. Suitable hydrocarbons include, for example, alkyl, alkenyl, aryl, alicyclic alkylaryl, or arylalkyl groups. The designation "2° or 3° carbon atom" refers to the classification of the carbon atom if the substituent were a carbonium ion not bonded to the cyclopentadienyl carbon atom. Of course once the substituent is covalently bonded to the cyclopentadienyl group, the classification of the carbon atom changes (increases in degree), however, the designation "2° or 3° carbon atom" is still utilized and refers to the substituent in its carbonium ion state and not its covalently bonded state. Preferably, the substituent is an alkyl having from about 3 to about 20 carbon atoms and comprising a 2° or 3° carbon atom with which it is covalently bonded to the cyclopentadienyl ring. More preferably, the substituent is an alkyl having from about 3 to about 7 carbon atoms and comprising a 2° or 3° carbon atom with which it is covalently bonded to the cyclopentadienyl ring. Most preferably, the substituent is an alkyl having from about 3 to about 5 carbon atoms and comprising a 2° or 3° carbon atom with which it is covalently bonded to the cyclopentadienyl ring. Exemplary substituents as the molecular weight distribution broadening or tensile impact strength enhancing substituent that comprise a 2° or 3° carbon atom include, but are not limited to, tertiary butyl, isopropyl, and 2° pentyl substituents. The tertiary butyl group comprises a 3° carbon atom at the second position, and the isopropyl group comprises a 2° carbon atom at the second position, with which they are respectively bonded to the cyclopentadienyl ring of the metallocene. For the purposes of the practice of this invention, the term "2° pentyl substituent" is intended to mean a pentyl group covalently bonded, or able to be bonded at any of the three middle carbons of the n-pentyl group. Preferably, the carbon atom at the third position is used to connect the n-pentyl group to the cyclopentadienyl ring.

Methods of substituting the molecular weight distribution broadening or tensile impact strength enhancing substituents onto the cyclopentadienyl ring of the metallocene are well known, and any suitable method may be utilized. Such methods include that of Wailes, et al., "Organometallic Chemistry of Titanium, Zirconium and Hafnium" (1974), herein incorporated by reference.

Generally, such methods involve a salt of the cyclopentadienyl compound, such as a lithium or sodium salt, that is reacted with a halogen substituted substituent. The halogen is removed from the carbon atom of the substituent by lithium or sodium and this carbon atom then covalently bonds to the cyclopentadienyl ring. For the present invention, this means that the halogen is substituted on the 2° or 3° carbon atom. In the reaction, the halogen forms a salt with the lithium or sodium, and the substituent is substituted onto the cyclopentadienyl ring connected by the 2° or 3° carbon atom. The substituted cyclopentadienyl is then recovered from the reaction mixture.

Catalyst System

The metallocene-alumoxane catalyst system of the present process may be prepared by any of the well known prior art methods. Such methods include preparing the alumoxane component of the active catalyst complex separately then adding it to a catalyst support material which is then treated with a metallocene to form an active catalyst complex. One procedure heretofore employed for preparing the alumoxane separately is that of contacting water in the form of a moist solvent with a solution of aluminum trialkyl in a suitable organic solvent such as benzene, other aromatics, or aliphatic hydrocarbons. As before noted this procedure is hazardous, attended by fire and explosion hazards and therefore requires the use of explosion-proof equipment and carefully controlled reaction conditions.

Another method for preparing the metallocene-alumoxane catalyst system of the present process involves contacting an aluminum alkyl with the metallocene followed by the addition of wet silica.

In an alternative prior art method heretofore employed for the separate production of alumoxane, an aluminum alkyl is contacted with a hydrated salt, such as hydrated copper sulfate. This method comprised treating a dilute solution of aluminum alkyl in, for example, toluene, with a copper sulfate pentahydrate. A slow, controlled hydrolysis of the aluminum alkyl to alumoxane results which substantially eliminates the fire and explosion hazard but with the disadvantage of the creation of hazardous waste products that must be disposed of and from which the alumoxane must be separated before it is suitable for use in the production of an active catalyst complex. Separate production of the alumoxane component by either procedure is time consuming and costly. Correspondingly, the use of a separately produced alumoxane greatly increases the cost of producing a metallocene alumoxane catalyst. Preferably, the metallocene-alumoxane catalyst system of the present invention is prepared by direct reaction of an aluminum trialkyl with the material utilized as the catalyst support, namely a "wet" silica gel. Wet silica gel generally comprises undehydrated silica gel and/or water impregnated silica gel.

Undehydrated silica gel useful as the catalyst support is that which has a surface area in the range of about 10 to about 700 $m^2/g$, the upper side of the range may also be from about 400 $m^2/g$ to about 500 $m^2/g$. The lower side of the range may be about 100 $m^2/g$ to about 200 $m^2/g$. The gel also has a pore volume of from about 3 to about 0.5 cc/g and preferably 2-1 cc/g, and an adsorbed water content of from about 0.5 to about 10 weight percent. The particle size of the silica should be from about 10 $\mu$m to about 100 $\mu$m, and preferably from about 30 $\mu$m to about 60 $\mu$m.

Water-impregnated silica gel useful as the catalyst support is that which has a surface area in the range of from about 10 to about 700 $m^2/g$, the upper side of the range may also be from about 400 $m^2/g$ to about 500 $m^2/g$, with the lower side of the range from about 100 $m^2/g$ to about 200 $m^2g$. The gel also has a pore volume of about 3 to about 0.5 cc/g and preferably 2-1 cc/g, and an adsorbed water content of from about 10 to about 50 weight percent, with the upper range from about 35 to 40, and a lower range of from about 20 to 35. The particle size of the silica should be from an upper range of from about 60 $\mu$m to about 100 $\mu$m and a lower range of from about 10 $\mu$m to about 30 $\mu$m.

Water-impregnated silica gel may be formed by adding sufficient water to commercially available silica gel (Davison 948) to create an aqueous slurry. Because silica gel possesses many fine pores, it is extremely adsorbent and will rapidly become saturated. Once the aqueous slurry is formed, excess water can be removed by filtration, followed by air drying, or only air drying, to a free flowing powder state. Drying at elevated temperatures is not recommended because it could substantially decrease the amount of adsorbed water.

Wet silica gel, as defined above, is slowly added over time, to a stirred solution of aluminum trialkyl, preferably trimethyl aluminum or triethyl aluminum, in an amount sufficient to provide a mole ratio of aluminum trialkyl to water of from about 3:1 to 0.9:1. Also suitable for use as the aluminum trialkyl are tripropyl aluminum, tri-n-butyl aluminum tri-isobutyl aluminum, tri(2-methylpentyl) aluminum, trihexyl aluminum, tri-n-octyl aluminum, and tri-n-decyl aluminum. The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like.

Upon addition of the wet silica gel to the solution of aluminum trialkyl, the water content of the silica gel controllably reacts with the aluminum trialkyl to produce an alumoxane which is deposited onto the surface of the silica gel particles. Although the reaction of the aluminum trialkyl with the water content of the silica gel proceeds relatively quickly, it does not occur with the explosive speed of that which occurs with free water. The reaction may be safely conducted in conventional mixing equipment under a mantle of inert gas.

Once the alumoxane-silica component has been formed, a metallocene may be added to the slurried suspension of alumoxane-silica gel product to form the metallocene-alumoxane catalyst, or the alumoxane silica component may be additionally processed to further enhance the ultimate catalytic activity of the formed catalyst.

Further processing would consist of drying the slurried suspension to remove the excess liquid, preferably drying the alumoxane-silica component to a powder, followed by reslurrying the alumoxane-silica component with a hydrocarbon solvent that is inert with respect to the alumoxane-silica component, such as for example isobutane, butane, pentane, hexane, heptane, octane, cyclohexane, methylcyclohexane, toluene, xylene and the like.

Once the suspension of alumoxane-silica gel is formed, either initially, or after reslurrying with the additional processing, a metallocene is added to the suspension of alumoxane silica gel product in an amount sufficient to provide a mole ratio of aluminum to transition metal of from about 1000:1 to about 1:1, preferably from about 300:1 to about 10:1 and most preferably from about 150:1 to about 30:1. The mixture is stirred for about 30 minutes to about one hour at ambient or an elevated temperature of about 75° C. to permit the metallocene to undergo completely complex with the adsorbed alumoxane. Thereafter, the solvent is removed and the residual solids are dried, preferably at a temperature of 75° C. or greater, to form a free flowing powder. The free flowing powder comprises a silica gel supported metallocene alumoxane catalyst complex of sufficiently high catalytic activity for use in the gas phase polymerization of olefins by conventional gas phase polymerization procedures.

The order of addition between the wet silica gel and the aluminum trialkyl is important with regards to the activity of the supported catalyst which results upon addition of the metallocene. A supported catalyst composition of little or no activity results wherein an aluminum trialkyl is added to a stirred solvent suspension of wet silica gel. It has been found that to prepare a supported catalyst composition of acceptable or high activity the order of mixing must be one wherein the wet silica gel is added to a stirred solution of the aluminum trialkyl. It is believed that this order of mixing forces the aluminum trialkyl to undergo a reaction in the context of a transient localized excess of aluminum trialkyl compared to a transient localized deficiency of water. Under mixing conditions in which silica gel is slowly added to a stirred solution of aluminum trialkyl, the bulk content of the aluminum trialkyl converts to alumoxane with a degree of oligomerization of about 6-25 ($y=6-25$). Production of alumoxane with this degree of oligomerization results in a final metallocene-alumoxane catalyst complex of useful or high activity. A reverse order of mixing, that is, addition of an aluminum trialkyl to stirred solvent suspension of wet silica gel yields an active catalyst, but it may be one with a lower degree of catalytic activity.

Further influencing the degree of activity attained in the final supported catalyst complex is the mole ratio of aluminum trialkyl to the adsorbed water content of the wet silica gel. The quantities of aluminum trialkyl employed should, in comparison to the quantity of wet silica gel of specified adsorbed water content, be selected to provide a mole ratio of aluminum trialkyl to water of from about 3:1 to about 1:2, preferably from about 2:1 to about 1.2:1, and more preferably from about 1.6:1 to about 1.3:1. It has been observed that for a given metallocene, a maximum catalyst activity is generally observed in the aluminum trialkyl to water mole ratio range of about 1.2:1 to about 0.9:1. Depending upon the particular aluminum trialkyl selected for use, commercially acceptable catalyst activities are exhibited in the aluminum trialkyl to water mole ratio range of about 3:1 to about 1:2.

Also influencing the cost of production and the level of catalytic activity obtained in the final supported catalyst complex is the mole ratio of aluminum to transition metal of the metallocene component. The quantity of metallocene added to the alumoxane adsorbed silica gel solids should be selected to provide an aluminum to transition metal mole ratio in the range of from about 5000:1, 2500:1 or 2000:1 to about 1:1, about 250:1 or and most preferably from about 1000:1. From the standpoint of economic considerations it is desirable to operate in the lower ranges of the aluminum to transition metal mole ratio in order to minimize the cost of catalyst production. The procedure of this invention is one which provides the maximum conversion of the aluminum trialkyl component to the most efficacious form of alumoxane, hence permits the safe production of a supported metallocene alumoxane catalyst of useful activity with low quantities of the costly aluminum trialkyl component.

The cost of production and the level of catalytic activity is also influenced by the mole ratio of metallocene to silica (dry). Generally there is in the range of about 0.01, about 0.1 or about 0.2 to about 5 mmoles, about 2 mmoles or about 1.7 mmoles metallocene per mole of dry silica.

By appropriate selection of the type and relative amounts of the metallocene and the aluminum trialkyl cocatalyst precursor, one can attain by the present method the particular active catalyst complex desired for any particular application. For example, higher concentrations of alumoxane in the catalyst system generally result in higher molecular weight polymer product.

Following the addition of the metallocene to the alumoxane adsorbed on the silica gel solids, the solvent is removed by filtering or evaporation, and the residual solids are dried to a free flowing powder. Drying of the residual solids may be conducted at a temperature up to about 85° C., and preferably at a temperature of about 75° C. The dried free flowing powder comprises a metallocene alumoxane complex adsorbed upon the surface of the silica gel support particles. The dried state composition exhibits a level of catalytic activity useful for gas phase polymerization of olefins.

Polymerization Process

The monomers that may be polymerized in the process of the present invention are selected from among cyclic or acyclic alpha-olefins and cyclic or acyclic polyenes.

Suitable alpha-olefins include those such as ethylene, propylene, 1-butene, 1-pentene, 1-hexene and 1-octene, 1-decene, 1-dodecene, 1-tetradecene, 1-hexadecene, 1-octadecene, 1-eicesene, and 4-methyl-1-pentene. These may be polymerized either alone or in combination. Preferably, ethylene is polymerized either alone or with at least one alpha-olefin having 3 or more carbon atoms.

In addition, the present invention may be utilized for the copolymerization of an alpha-olefin with a polyene. The polyene utilized in the present invention generally has in the range of about 2 to about 20 carbon atoms. Preferably, the polyene has in the range of from about 3 to about 20 carbon atoms, most preferably in the range of from about 4 to about 15 carbon atoms. Preferably, the polyene is a diene with a double bond in the alpha position and generally has in the range of about 3 to about 20 carbon atoms. Preferably, the diene utilized in the present invention is a straight chain, branched chain or cyclic hydrocarbon diene preferably having from about 4 to about 20 carbon atoms, and most preferably from about 4 to about 15 carbon atoms, and still most preferably in the range of about 6 to about 15 carbon atoms. Most preferably, the diene is a nonconjugated diene. Examples of suitable dienes are straight chain acyclic dienes such as: 1,3-butadiene, 1,4-pentadiene, 1,4-hexadiene, 1,6-octadiene, 1,7-octadiene, 1,8-nonadiene and 1,9-decadiene; branched chain acyclic dienes such as: 5-methyl-1,4-hexadiene, 3,7-dimethyl-1,6-octadiene, 3,7-dimethyl-1,7-octadiene and mixed isomers of dihydromyricene and dihydroocinene; single ring alicyclic dienes such as: 1,3-cyclopentadiene, 1,4-cylcohexadiene, 1,5-cyclooctadiene and 1,5-cyclododecadiene; and multi-ring alicyclic fused and bridged ring dienes such as: tetrahydroindene, methyl tetrahydroindene, dicylcopentadiene, bicyclo-(2,2,1)-hepta-2-5-diene; alkenyl, alkylidene, cycloalkenyl and cycloalkylidene norbornenes such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornene. Of the dienes typically used to prepare EPR's, the particularly preferred dienes are 1,4-hexadiene, 5-ethylidene-2-norbornene, 5-vinylidene-2-norbornene, 5-methylene-2-norbornene and dicyclopentadiene. The especially preferred dienes are 5-ethylidene-2-norbornene and 1,4-hexadiene.

The polymer produced according to the present invention will generally comprise in the range of about 5 to about 95 mole percent ethylene (based on the moles of monomer) with the other monomers making up the balance. Preferably, the polymers comprises in the range of from about 60 to 95 mole percent ethylene with the other monomers making up the balance.

The polymer of the present invention will have a density in the range of from about 0.89 to about 0.965 g/cm$^3$, preferably in the range of from about 0.89 to about 0.93 g/cm$^3$.

Specific methods for making ethylene/alpha-olefin copolymers, and ethylene/alpha-olefin/diene terpolymers are taught in U.S. Pat. No. 4,871,705 to Hoel, and in U.S. patent application Ser. No. 207,672, filed Jun. 16, 1988 by Floyd et al, respectively, both hereby incorporated by reference.

In the process of the present invention, the polymerization may be conducted by a solution, slurry, or gas-phase technique, generally at a temperature in the range of from about 0° C. to about 200° C., or even higher, and under atmospheric, subatmospheric, or superatmospheric pressure conditions; and conventional polymerization adjuvants, such as hydrogen may be employed if desired. Preferably, the process of the present invention utilizes gas-phase polymerization. It is generally preferred to use the catalyst compositions at a concentration such as to provide at least from about 0.000001 percent, most preferably at least about 0.00001 percent by weight of transition metal based on the weight of the monomer(s), in the polymerization of ethylene, alone or with one or more higher olefins. The upper limit of the percent by weight of transition metal present is determined by catalytic activity and process economics.

A slurry or solution polymerization process can utilize sub- or superatmospheric pressures and temperatures in the range of from about 40° C. to about 110°. In a slurry polymerization, a suspension of solid, particulate polymer is formed in a liquid polymerization medium to which ethylene, alpha-olefin comonomer, hydrogen and catalyst are added. The liquid employed as the polymerization medium can be an alkane or a cycloalkane, such as butane, pentane, hexane, or cylclohexane, or an aromatic hydrocarbon, such as toluene, ethylbenzene or xylene. The medium employed should be liquid under the conditions of the polymerization and relatively inert. Preferably, hexane or toluene is employed.

A gas-phase polymerization process utilizes superatmospheric pressure and temperatures in the range of from about 50° C. to about 120° C. Gas phase polymerization can be performed in a stirred or fluidized bed of catalyst and product particles in a pressure vessel adapted to permit the separation of product particles from unreacted gases. Thermostated ethylene, comonomer, hydrogen and an inert diluent gas such as nitrogen can be introduced or recirculated so as to maintain the particles at a temperature of about 50° C. to about 120° C. Triethylaluminum may be added as needed as a scavenger of water, oxygen, and other adventitious impurities. Polymer product can be withdrawn continuously or semi-continuously at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal.

MWD, polydispersity, or ($M_w/M_n$) are generally synonymous and are useful indicators of processability as well as indicators of molecular structure. Generally as MWD increases, the processability of the polymer increases. Also, generally as MWD increases some of the polymer characteristics will degrade; such as, for example, strength. Conversely as MWD decreases, generally, some polymer properties such as, for example, strength will increase while the processability will decrease.

These general trends may be altered in some cases such as, for example, the instances in which the MWD is multi-modal. Since MWD is essentially an average over a range, a polymer displaying a multi-modal distribution may offer a high molecular weight (MW), good processability, and yet still retain good strength. For these reasons, it is likely that polymers having upper limits in the higher ranges of MWD, such as, for example, about 2.5 to 1000, when obtained by the practice of this invention, may have useful properties as well as being easily processable.

In accordance with the process of the present invention, polymer is obtained with a broadened molecular weight distribution as compared to polymer obtained utilizing prior art catalysts at the same or similar polymerization conditions. Generally the polymer will have a molecular weight distribution greater than 4. Preferably, the polymer will have a molecular weight distribution greater than 5, and more preferably greater than about 6, and most preferably greater than about 8.

Also in accordance with the process of the present invention, polymer is obtained having improved impact strength as compared to polymer obtained utilizing prior art catalysts at the same or similar polymerization conditions. For melt indexes less than about 5 dg/min, densities less than about 0.93 g/cm$^3$ and with about the same comonomer and comonomer content, polymers produced by the present invention have at least 200% the tensile impact strength of polymers produced utilizing conventional Ziegler-type catalysts. Preferably, the tensile impact strength is at least 250%, most preferably at least 300%. As the melt index (MI) increases, this improved impact strength phenomenon tends to be diminished, and in fact will converge at high melt indexes and densities. The polymers of the present invention will generally have a MI of at least 0.5 ranging up to that MI at which the impact strength is diminished. Typically the range of MI for the present polymer is in the range of from about 0.5 to 10. For film applications the MI is in the range of from about 0.5 to 3.5, and for molding applications the MI is in the range of from about 5 up to that MI at which the impact strength is diminished.

The polymer obtained in the present process can be extruded into water and cut into pellets or other suitable comminuted shapes. Pigments, antioxidants, fillers, stabilizers, processing aids, and other additives, as are known in the art, may be added to the polymer.

The polymers produced by the process of the present invention are capable of being fabricated into a wide variety of articles, as is known for homopolymers of ethylene and copolymers of ethylene and higher alpha-olefins, including films and molded articles.

The compositional distribution breadth index (CDBI) for the polymer produced according to the present invention is generally in the range of from about 30 to about 95 percent. For polymers produced utilizing a high pressure process the CDBI is generally in the range of from about 70 to about 95 percent, preferably in the range of from about 75 to about 95 percent, and most preferably in the range of from about 80 to about 95 percent. For polymers produced utilizing a gas phase process the CDBI is generally in the range of from about 50 to about 75 percent, preferably in the range of from about 55 to about 75 percent, and most preferably in the range of from about 65 to about 75 percent.

The CDBI and homopolymer content are both determined by the Temperature Rising Elution Fractionation (TREF) technique described in U.S. patent application Ser. No. 151,350 and Wild, et al., *J. Poly, Sci. Ed.*, Vol. 20, p. 441, (1982), both herein incorporated by reference. The solvent was tetrachloroethylene, the temperature range was 0° C. to 120° C. The CDBI is defined as the weight percent of polymer molecules having a comonomer content within the median molar comonomer content p25%. High CDBIs correspond to narrow SCB distributions. The homopolymer content, i.e. portion containing no SCBs, is the weight percent eluting above 85° C. column temperature, the temperature above which no SCBs are detected.

Hexane extractables is determined with a Soxtec extractor on samples milled to 20-mesh. Each sample is weighed, extracted with hexane at reflux conditions for one hour, rinsed for two hours, dried and reweighed. Weight percent hexane extractables is calculated from weight loss. Hexane extractables captures not only low molecular weight content, but also material with high SCB frequencies, regardless of molecular weight.

Molecular weight profiles were determined using Size Exclusion Chromatography. The included data was obtained at 145° C. with a Waters SEC using Ultrastyrogel columns and a refractive index detector. The solvent was trichlorobenzene; the calibration standards were polystyrene. The key statistics are number-average molecular weight (Mn), weight-average molecular weight (Mw), Z-average molecular weight (Mz), polydispersity index (Mw/Mn), and the Mz/Mw ratio.

Viscosity was measured with an Instron Capillary Rheometer at 190° C. at ten different shear rates ranging from 13.7 s$^{-1}$ to 13.7K s$^{-1}$. Viscosity was measured to reflect processability parameters such as extruder power draw and head pressure. The first point of discontinuity as shear rate increases in the shear stress vs. shear rate curve is assumed to be the onset of surface melt fracture, another key processability parameter for linear polyethylenes.

Tensile impact was measured according to ASTM D-1822.

The following examples are presented to illustrate the present invention in order that it may be more readily understood. These examples are not intended to limit in any manner, the scope of the present invention as it has been described in the specification above.

EXAMPLES

EXAMPLE 1 - PREPARATION OF METALLOCENE

Figure 2:
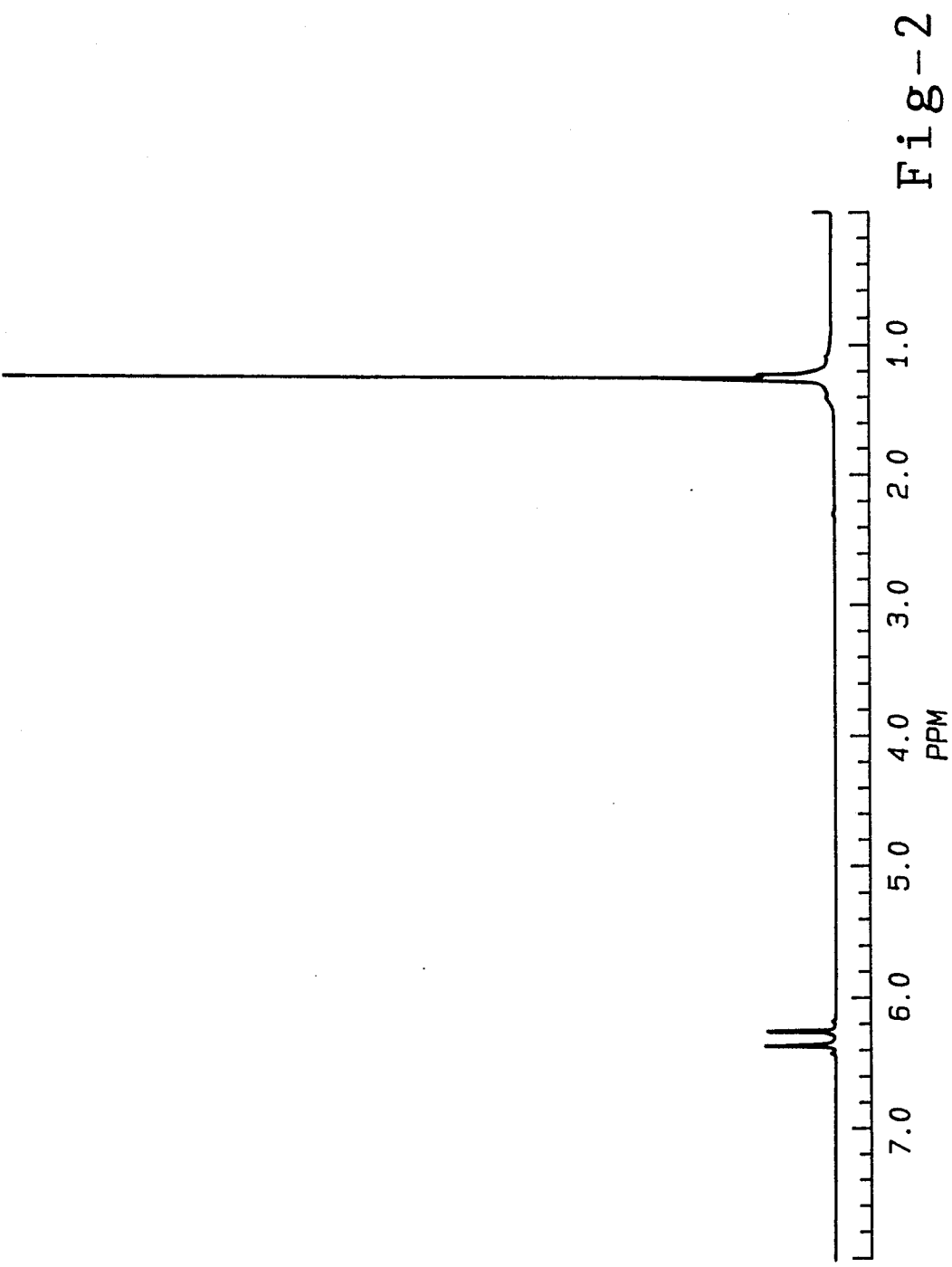
FIG. 2 is a $^1$H NMR (400MHz) trace for (t-BuCp)ZrCl$_2$ showing the methyl protons of the t-butyl at about 1.25 parts per million (ppm) and showing the protons of the Cp ring at about 6.3 ppm.

Bis($\eta^5$-n-propylcyclopentadienyl)zirconium (IV) dichloride {(n-PrCp)$_2$ZrCl$_2$}; bis($\eta^5$-i-propycyclopentadienyl)zirconium (IV) dichloride {(i-PrCp)$_2$ZrCl$_2$}; bis($\eta^5$-i-butylcyclopentadienyl(zirconium (IV) dichloride {(i-BuCp)$_2$ZrCl$_2$}; bis($\eta^5$-i-pentylcyclopentadienyl)(zirconium (IV) dichloride {3-PentCp)$_2$ZrCl$_2$} and bis($\eta^5$-t-butylcyclopentadienyl)zirconium (IV) dichloride {t-BuCp)$_2$ZrCl$_2$} were prepared using similar procedures. For example, (t-BuCp)$_2$ZrCl$_2$ was prepared according to the following methods:

2-Bromo-2-methyl propane (353.5 g, 2.582 mol, Aldrich) was transferred into a 2-1 reaction flask with sidearms at 5° C. Sodium cyclopentadienide (1290 cm$^3$ of a 2.0M solution in THF, 2.582 mol, Aldrich) was slowly added. After complete addition, the reaction set-up was allowed to warm up to ambient temperature over 12 hours. Distilled water was added to dissolve the resulting sodium bromide and the THF solution was collected over anhydrous sodium sulfate. The aqueous layer was repeatedly extracted with diethyl ether and combined with the THF solution. Filtration afforded the crude 2-cyclopentadienyl-2-methyl propane (t-BuCp), the solvent was removed and the crude product was fractionally distilled to obtain the pure (t-BuCp), boiling point 125° C. A sample of the pure t-BuCp (42.81 g, 0.351 mol) and THF (400 cm$^3$) were transferred into a 1-1 reaction flask equipped with a mechanical stirrer. n-Butyl lithium (223 cm$^3$ of a 1.6M solution in hexanes, 0.357 mol, Aldrich) was added dropwise at ambient temperature. The mixture was vigorously stirred for 3 hours and the resulting solution of t-BuC$_5$H$_4$-Li+ was slowly added to a suspension of ZrCl$_4$ (40.78 g, 0.175 mol) in THF (100 cm$^3$) at −78° C. After complete addition of the lithiated salt, stirring continued and the reaction slowly warmed up to ambient temperature over 12 h. The solvent was stripped off under reduced pressure and the crude product was Soxhlet extracted in toluene to yield crystals, after cooling, of (t-BuCp)$_2$ZrCl$_2$. FIGS. 1 and 2 show the $^1$H NMR traces (400 MHz) for Bis(i-PropylCyclopentadienyl) Zirconium Dichloride and Bis(t-ButylCyclopentadienyl) Zirconium Dichloride, respectively.

EXAMPLE 2 - Preparation of Support Material

A solution of 10 wt % trimethylaluminum (TMA) in isopentane was sampled into a 3-1 reaction flask equipped with a mechanical stirring device and an addition funnel containing a 200 g portion of a Davison D-948 silica. The silica had 9.7 wt % water content. After complete addition of silica to the TMA solution at −5° C., the resulting suspension was stirred for a further 1 hour at 25° C. before removing the isopentane solvent under reduced pressure to give a free-flowing stock support material.

EXAMPLE 3 - Supported Metallocene Catalysts

The procedure used for supporting (n-PrCp)$_2$ZrCl$_2$ and (t-BuCp)$_2$ZrCl$_2$ are similar; for example, 0.761 g (2.02 mmol) (n-PrCp)$_2$ZrCl$_2$ was dissolved in a toluene/heptane (1:1, v/v) mixture. This solution was then added slowly over 40 minutes to a slurry of a 30 g portion of the support material so described above in 100 cm$^3$ heptane. The reaction temperature was maintained at 60° C. for an additional 1 hour before drying the resulting catalyst to a free-flowing powder. The final catalyst has a loading of 0.6 wt % Zr and Al:Zr molar ratio of 76.

Example 4 - POLYMERIZATION TESTS (a) A sample of (t-BuCp)$_2$ZrCl$_2$ supported on the treated silica as described above was used for ethylene homopolymerization and ethylene/1-butene copolymerization studies as described below.

(b) A continuous fluid bed gas-phase reactor operated at 300 psig total pressure, 65° C. reactor temperature and 0.7 ft/s cycle gas velocity was used for determining catalyst efficiency and response to co-monomer such as 1-butene. A solution of TEAL (1 wt % in isopentane) was fed into the reactor as a scavenger at a rate of 1 cm$^3$/h. A detailed composition of ethylene and 1-butene composition in the reactor is included in Table I. Polymer samples were collected and analyzed after three bed turnovers.

Molecular weight attributes (see Table I) were determined by using a Water's Associates Model 150 C gel permeation chromatographic (GPC) instrument. The measurements were obtained by dissolving polymer samples in hot trichlorobenzene (TCB) and filtering. The GPC runs were performed at 145° C. in TCB at a flow rate of 1 cm$^3$/min. Styragel columns from Perkin Elmer, Inc. were used. The integration parameters were recorded using a Hewlett-Packard computer. With a 52.8 mol % ethylene, 6.7 mol % 1-butene and 370 ppm hydrogen in the reactor, the polymer produced has density of 0.917 g/cc, Mw of 57700 g/mol and Mw/Mn of 8.3.

Example 5 - POLYMERIZATION (t-BuCp)$_2$ZrCl$_2$ supported on the treated silica prepared in a manner similar to the details in Example 3 was used for ethylene/1-butene copolymerization. The density of the polymer produced is 0.933 g/cc, Mw of 42,700 g/mol and Mw/Mn of 5.9.

| Compound Used | Ethylene mol % | But-1-ene mol % | Hydrogen ppm | Catalyst rate g/h | Polymer rate g/h | MI dg/mbr | Density g/cc | Mw g/mol | MWD |
|---|---|---|---|---|---|---|---|---|---|
| (tBuCp)2ZrC12 | 52.8 | 6.7 | 370 | 0.671 | 112 | 33.4 | 0.917 | 57700 | 8.3 |
| (tBuCp)2ZrC12 | 49.8 | 4.7 | 100 | 1.001 | 210 | 7.9 | 0.933 | 42700 | 5.9 |
| (tBuCp)2ZrC12 | 53.5 | 0 | 310 | 0.921 | 150 | 5.8 | 0.967 | 60600 | 4.9 |
| (iPrCp)2ZrC12 | 52 | 6.6 | 300 | 0.158 | 177 | 1.9 | 0.919 | 95500 | 5.6 |
| (iPrCp)2ZrC12 | 52 | 6.6 | 400 | 0.225 | 274 | 1.9 | 0.917 | 106500 | 4.5 |
| (iPrCp)2ZrC12 | 52 | 6.6 | 0 | 0.233 | 147 | 0.1 | 0.914 | 176300 | 8.8 |
| (3-PentCb)2ZrC12 | 52 | 4.5 | 200 | 0.156 | 161 | 4.3 | 0.921 | 75270 | 4.2 |
| (tBuCp)2ZrC12 | 53 | 6.1 | 300 | 0.501 | 297 | 2.5 | 0.907 | 85000 | 2.6 |
| (mPrCp)2ZrC12 | 49.2 | 6.4 | 380 | 0.361 | 280 | 1.4 | 0.909 | 102800 | 2.8 |

Example 6 - POLYMERIZATION (t-BuCp)$_2$ZrCl$_2$ supported on the treated silica prepared in a manner similar to the details in Example 3 was used for ethylene/1-butene copolymerization. The density of the polymer produced is 0.967 g/cc, Mw is 60600 g/mol and Mw/Mn of 4.9.

Example 7 - POLYMERIZATION

The procedure described in Example 3 was followed with the exception that (i-PrCp)$_2$ZrCl$_2$ was used as the transition metal complex to prepare the supported catalyst. The polymer produced has density of 0.919 g/cc, Mw of 95,500 g/mol and Mw/Mn of 5.6.

Example 8 - POLYMERIZATION

This example duplicates the conditions in Example 7 with the exception that the production rate was increased by increased catalyst charge rate. Polymer produced has density of 0.917 g/cc, Mw of 106500 g/mol and Mw/Mn of 4.5.

Example 9 - POLYMERIZATION

The procedure described in Example 7 was followed with the exception that hydrogen was not used during reaction. The polymer produced has density of 0.914 g/cc, Mw of 176300 g/mol and Mw/Mn of 8.8.

Example 10 - POLYMERIZATION

The procedure described in Example 4 was followed with the exception that (3-PentCp)$_2$ZrCl$_2$ was used as the transition metal complex in the supported catalyst. The polymer produced has density of 0.912 g/cc, Mw of 75270 g/mol and Mw/Mn of 4.2.

Example 11 - POLYMERIZATION

This is a comparative example whereby the details in Example 4 were followed with the exception that (i-BuCp)$_2$ZrCl$_2$ was used as the transition metal complex in the supported catalyst. The polymer produced has density of 0.907 g/cc, Mw of 85000 g/mol and Mw/Mn of 2.6.

Example 12 - POLYMERIZATION

This is a comparative example whereby the details in Example 4 were adopted with the exception that (n-PrCP)$_2$ZrCl$_2$ was used as the transition metal complex in the supported catalyst. The polymer produced has density of 0.909 g/cc, MW of 102800 g/mol and Mw/Mn of 2.8.

Example 13 - IMPROVED TENSILE IMPACT STRENGTH

For this Example, six polymers were produced by the catalyst and method of the present invention and two commercial type ethylene-butene copolymers were produced by prior art catalysts and methods, with the results presented in Tables II, III and IV. The experimental copolymers, Polymers A-F, were produced in a gas phase reactor with a catalyst of the present invention, a bis(isopropyl cyclopentadienyl) zirconium dichloride or bis(t-butyl cyclopentadienyl) zirconium dichloride The two commercial copolymers utilized as comparative controls, Polymers G-H, were produced in a fluidized bed gas phase reactor; example G with a Ti-based multisite catalyst, example H with a Cr-based multisite catalyst.

The structure of each copolymer is characterized by its density, molecular weight profile, and short-chain branching distribution. The processability of each is indicated by its capillary rheology response; its toughness, by its impact resistance.

All eight Polymers A-H fall within the 0.910-0.920 g/cc density range, as determined by ASTM D-792.

The principal structural distinction between copolymers A-F and the commercial copolymers G-H is intermolecular short-chain branching (SCB) distribution. The Polymers A-F formed utilizing the catalyst and method of the present invention all have considerably narrower SCB distributions than the controls, as evidenced by their high Composition Distribution Breadth Indices (CDBI), low hexane extractables (at equivalent density), and the absence of any unbranched material (no homopolymer). Both controls have very broad SCB distributions; each has a low CDBI, high hexane extractables (at equivalent density), and high homopolymer content. Narrow SCB distributions are achieved with a metallocene-alumoxane catalyst of the invention; broad SCB distributions are common to all commercial, conventional Ziegler-type catalyst used to produce linear polyolefins.

The most significant distinctions between Polymers A-F of the present invention and the control Polymers G and H are extractables, impact strength-processability balance, and homopolymer content. At equivalent densities, the lower extractables in the experimental samples indicates that films made with these copolymers will have lower reblock than films made with conventional Ziegler-type catalyzed copolymers. At equivalent Mw, the processability of the experimental copolymers is slightly better than that of the Ti-based commercial copolymer. At equivalent Mw, the tensile impact of the experimental copolymers is approximately three times higher than that of both conventional Ziegler-type catalyzed copolymers. At equivalent density, the very low homopolymer content in the experimental copolymers indicates that films made with these materials will have better clarity than films made with conventional Ziegler-type catalyzed copolymers.

The catalysts utilized in the present invention are extremely pure single site catalysts. FIG. 1 is a $^1$H NMR(400MHz) trace for (t-BuCp)ZrCl$_2$ showing the methyl protons of the t-butyl at about 1.25 ppm and showing the protons of the Cp ring at about 6.3 ppm. FIG. 2 is a $^1$H NMR(400MHz) trace for (i-PrCp)ZrCl$_2$ showing the methyl protons of the i-propyl at about 1.2 ppm, the methine proton of the i-propyl at about 3.1 ppm, and showing the protons of the Cp ring at about 6.2 ppm.

TABLE II

| Ethylene-Butene Copolymers Produced In A Single, Gas Phase Reactor With Bis(R-Cp)$_2$ZrCl$_2$ Catalysts | | | |
|---|---|---|---|
| Attribute | Polymer A | Polymer B | Polymer C |
| Cp R-group | i-propyl | i-propyl | t-butyl |
| density | 0.916 g/cc | 0.919 g/cc | 0.919 g/cc |
| Mn | 23,700 | 17,100 | 19,200 |
| Mw | 106,500 | 95,600 | 89,000 |
| Mz | 285,300 | 236,300 | 186,000 |
| Mw/Mn | 4.5 | 5.6 | 4.6 |
| Mz/Mw | 2.7 | 2.5 | 2.1 |
| CDBI | 56.8% | 55.1% | 54.5% |
| Hexane Extractables | 4.1% | 4.2% | 13.3% |
| Homopolymer Content | <0.1% | <0.1% | <0.1% |
| Viscosity 190 C. | | | |

TABLE II-continued

Ethylene-Butene Copolymers Produced In A Single, Gas Phase Reactor With Bis(R-Cp)$_2$ZrCl$_2$ Catalysts

| Attribute | Polymer A | Polymer B | Polymer C |
|---|---|---|---|
| @13.7 s$^{-1}$ | 4550 Pa-sec | 355 Pa-sec | 3315 Pa sec |
| @34.2 s$^{-1}$ | 3175 Pa-sec | 2655 Pa-sec | 2380 Pa-sec |
| @68.3 s$^{-1}$ | 2290 Pa-sec | 2045 Pa-sec | 1810 Pa-sec |
| @137 s$^{-1}$ | 1640 Pa-sec | 1475 Pa-sec | 1325 Pa-sec |
| @342 s$^{-1}$ | 960 Pa-sec | 905 Pa-sec | 815 Pa-sec |
| Onset of Melt Fracture | 342 s$^{-1}$ | 683 s$^{-1}$ | 683 s$^{-1}$ |
| Tensile Impact | 347 ft-lb/in$^2$ | 282 ft-lb/in$^2$ | 345 ft-lb/in$^2$ |

TABLE III

Ethylene-Butene Copolymers Produced In A Single, Gas Phase Reactor With Bis(R-Cp)$_2$ZrCl$_2$ Catalysts (con't)

| Attribute | Polymer D | Polymer E | Polymer F |
|---|---|---|---|
| Cp R-group | t-butyl | i-propyl | i-propyl |
| density | 0.910 g/cc | 0.919 g/cc | 0.914 g/cc |
| Mn | 7,300 | 13,400 | 20,100 |
| Mw | 59,800 | 65,600 | 176,300 |
| Mz | 144,200 | 151,600 | 421,100 |
| Mw/Mn | 8.1 | 4.9 | 8.8 |
| Mz/Mw | 2.5 | 2.3 | 2.4 |
| CDBI | 60.9% | 59.6% | 61.8% |
| Hexane Extractables | N/A | N/A | N/A |
| Homopolymer Content | <0.1% | <0.1% | <0.1% |
| Viscosity 190 C. | | | |
| @13.7 s$^{-1}$ | 1025 Pa-sec | 1265 Pa-sec | 14500 Pa-sec |
| @34.2 s$^{-1}$ | 835 Pa-sec | 875 Pa-sec | 8100 Pa-sec |
| @68.3 s$^{-1}$ | 710 Pa-sec | 785 Pa-sec | (4380 Pa-sec) |
| @137 s$^{-1}$ | 580 Pa-sec | 635 Pa-sec | (2260 Pa-sec) |
| @342 s$^{-1}$ | 390 Pa-sec | 440 Pa-sec | (935 Pa-sec) |
| Onset of Melt Fracture | None Observed | 3420 s$^{-1}$ | 34.2 s$^{-1}$ |
| Tensile Impact | 60 ft-lb/in$^2$ | 49 ft-lb/in$^2$ | 512 ft-lb/in$^2$ |

TABLE IV

Ethylene-Butene Copolymers Produced In A Single, Gas Phase Reactor With Commercial, Conventional Ziegler-Type Catalysts

| Attribute | Polymer G | Polymer H |
|---|---|---|
| Cp R-group | Titanium-based | Chromium-based |
| density | 0.918 g/cc | 0.920 g/cc |
| Mn | 31,800 | 14,000 |
| Mw | 105,600 | 99,500 |
| Mz | 279,800 | 398,400 |
| Mw/Mn | 3.3 | 7.1 |
| Mz/Mw | 2.7 | 5.5 |
| CDBI | 16.8% | 25.9% |
| Hexane Extractables | 9.9% | 16.9% |
| Homopolymer Content | <15.0% | <23.7% |
| Viscosity 190 C. | | |
| @13.7 s$^{-1}$ | 4650 Pa-sec | 3075 Pa-sec |
| @34.2 s$^{-1}$ | 3485 Pa-sec | 1995 Pa-sec |
| @68.3 s$^{-1}$ | 2600 Pa-sec | 1400 Pa-sec |
| @137 s$^{-1}$ | 1850 Pa-sec | 980 Pa-sec |
| @342 s$^{-1}$ | 1105 Pa-sec | 575 Pa-sec |
| Onset of Melt Fracture | 683 s$^{-1}$ Observed | None |
| Tensile Impact | 110 ft-lb/in$^2$ | 85 ft-lb/in$^2$ |

The following figures illustrate data for the butene copolymers of the invention of Example 13.

Figure 3:
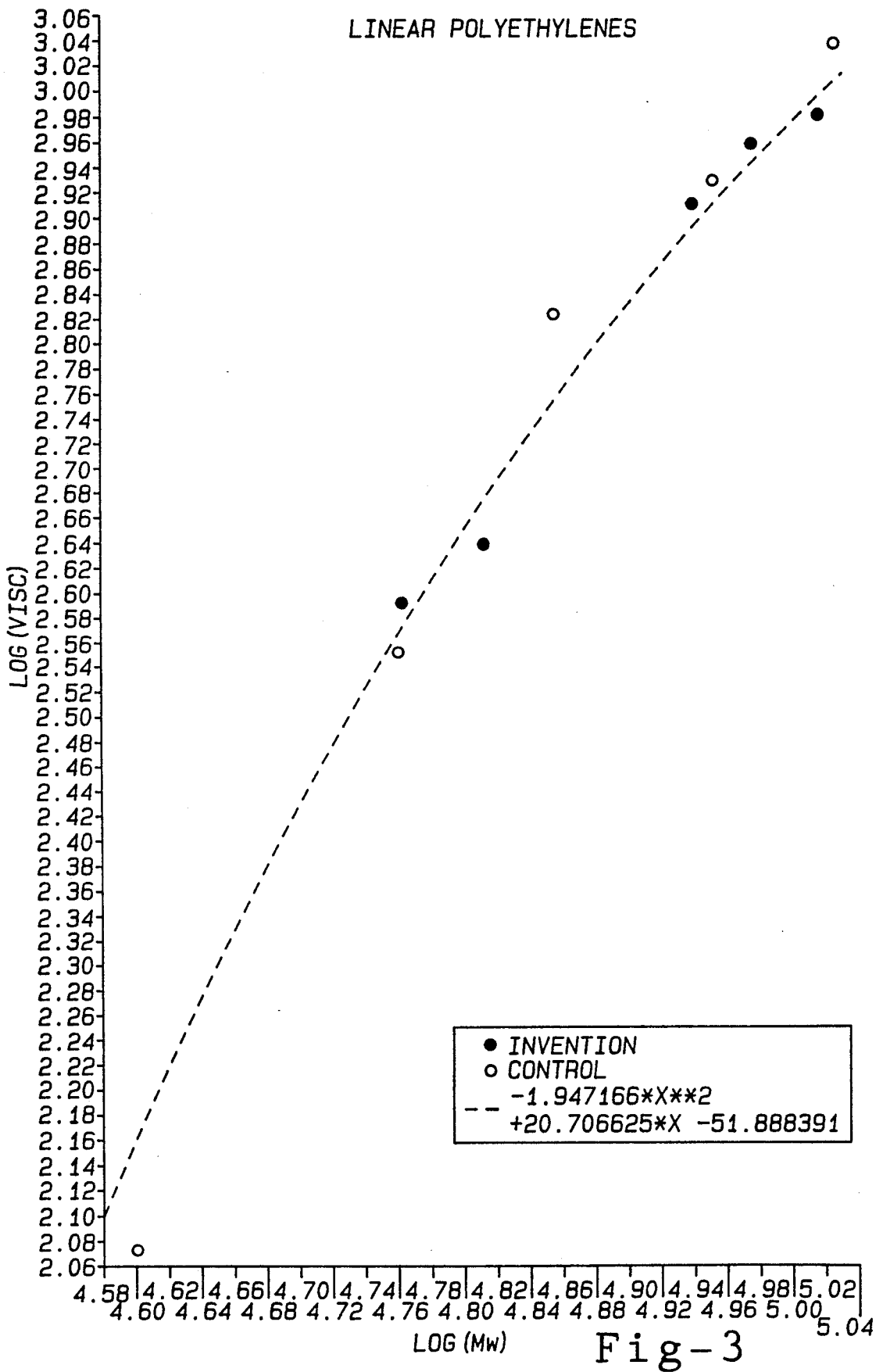
FIG. 3 is a plot of log viscosity vs. log molecular weight for polymers of this invention (solid dot) and for conventional polymers produced by a heterogeneous catalyst of the conventional Zielger-type catalyst.

FIG. 3 is a plot of log viscosity vs. log molecular weight for polymers of this invention (solid dot) and for conventional polymers produced by a heterogeneous catalyst of the conventional Ziegler-type catalyst. Viscosity is the key melt property that correlates with such processing parameters as extruder pressure, power draw, torque, etc. Viscosity was measured at 190° C. and 340s$^{-1}$.

This plot shows that the processability of polymers of this invention and conventionally produced polymers are equivalent.

Figure 4:
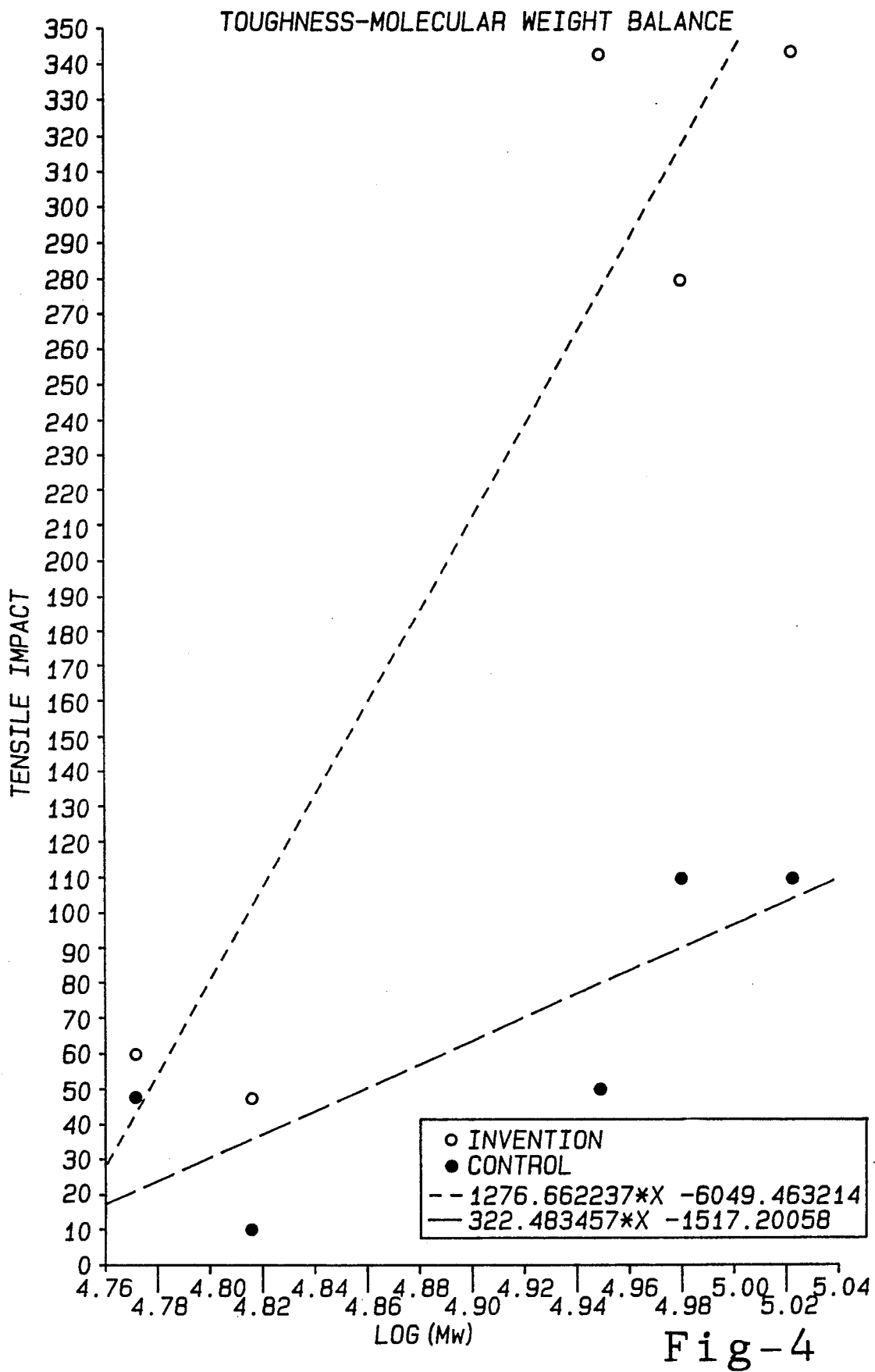
FIG. 4 is a plot of tensile impact vs. log molecular weight for polymers of this invention (circles) and for conventional polymers produced by a heterogeneous catalyst of the conventional Zielger-type catalyst (solid dots). The regression lines for the polymers of this invention and for the conventional Zielger-type catalyst type polymers are represented by dots and dashes, respectively.

FIG. 4 is a plot of tensile impact vs. log molecular weight for polymers of this invention (circles) and for conventional polymers produced by a heterogeneous catalyst of the conventional Ziegler-type catalyst (solid dots). The regression lines for the polymers of this invention and for the conventional Ziegler-type catalyst type polymers are represented by dots and dashes, respectively. The ratio of the slopes of the two linear regression curves is about 4 (1276.66/322.48=3.959). Generally this ratio will be at least about 1.5, preferably, at least about 2, and most preferably at least about 4.

Figure 5:
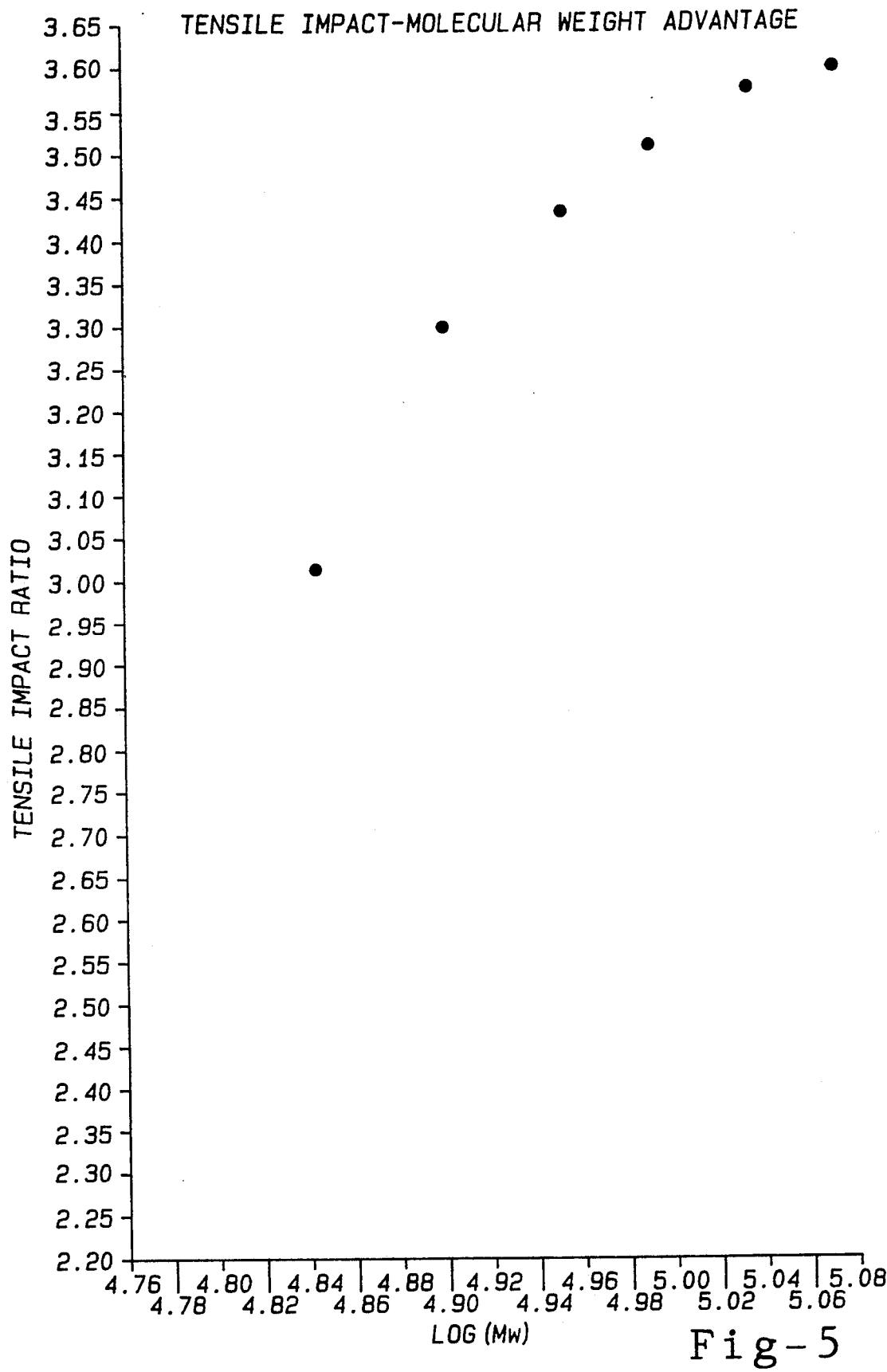
FIG. 5 is a plot of tensile impact ratio vs. log molecular weight for the polymers of this invention and for conventional Zielger-type catalyst type polymers.

FIG. 5 is a plot of tensile impact ratio vs. log molecular weight based on modeled data for the polymers of this invention and for conventional Ziegler-type catalyst type polymers. This shows that the polymers of the present invention have at least twice the tensile impact as the controls at a Mw of 60,000 (i.e., certain injection molding applications), and greater that three times the tensile impact of the controls at Mw greater than 70,000 (i.e., film applications). As shown, the impact varies from about twice to about 3.6 times.

We claim:

1. A process for producing homo- or co- polymers having a broad molecular weight distribution comprising the steps of:
   (a) polymerizing alpha-olefin monomer, optionally with co-monomer, in the presence of a catalyst system comprising:
      (i) at least one metallocene having at least one cyclopentadienyl ring being substituted by at least one optionally substituted hydrocarbon substituent having 3 to 20 carbon atoms and having a 2° or 3° carbon atom and said hydrocarbon substituent is bonded to said at least one cyclopentadienyl ring at said 2° or 3° carbon atom; and
      (ii) an activator selected from ionic activators or alumoxane or combinations thereof; and
   (b) collecting the desired polymer.

2. A process of claim 1 for producing homo or co-polymers having a broad molecular weight distribution comprising the steps of:
   (a) polymerizing alpha-olefin monomer, optionally with co-monomer, in the presence of catalyst system comprising:
      (i) metallocene selected from the group of metallocenes represented by the general formulas:

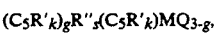

$$(C_5R'_k)_g R''_s (C_5R'_k) MQ_{3-g}, \quad \text{I}$$

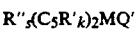

$$R''_s(C_5R'_k)_2 MQ' \quad \text{II}$$

wherein (C$_5$R'$_k$) is a substituted cyclopentadienyl; M is selected from the group consisting of Group IVB and Group VB transition metals; each group R' is the same or different with at least one R, being a hydrocarbyl or substituted hydrocarbyl group comprising a 2° or 3° carbon atom through which it is covalently bonded to the cyclopentadienyl group, with the remainder R' groups being hydrogen or a hydrocarbyl radical selected from the group consisting of alkyl alkenyl, aryl, alkylaryl, and arylalkyl radicals having 3 to 20 carbon atoms, or a silicon-containing hydrocarbyl radical, or a hydrocarbyl radical wherein two carbon atoms are joined together to form a $C_4$–$C_6$ ring; R″ is $C_1$–$C_4$ alkylene radical, a dialkyl germanium or silicone, or an alkyl phosphine or amine radical bridging one pair of the ($C_5R'_k$) rings; each Q is independently a halogen or a hydrocarbyl radical selected from the group consisting of aryl, alkyl, alkenyl, alkylaryl and arylalkyl having 1–20 carbon atoms, or a hydrocarboxyl radical having 1–20 carbon atoms; Q′ is an alkylidene radical having from 1 to about 20 carbon atoms; s is 0 or 1, g is 0, 1 or 2; when g is 0, s is 0; k is 4 when s is 1 and k is 5 when s is 0; and (ii) an activator selected from ionic activators or alumoxane, or combinations thereof; and (b) collecting the desired polymer.

3. The process of claim 1 or 2 wherein said polymerizing occurs in a solution, gas, or slurry phase reactor.

4. The process of claim 1, or 2 wherein the at least one optionally substituted hydrocarbon substituent bonded at a 2° or 3° carbon atom is an alkyl having in the range of about 3 to about 10 carbon atoms.

5. The process of claim 1, or 2 wherein the at least one optionally substituted hydrocarbon substituent bonded at a 2° or 3° carbon atom is an alkyl having in the range of about 3 to about 5 carbon atoms.

6. The process of claim 1, or 2 wherein the at least one optionally substituted hydrocarbon substituent bonded at a 2° or 3° carbon atom is selected from the group consisting of t-butyl, i-propyl, and a 2 pentyl substituent.

7. The process of claim 1, or 2 wherein said alpha-olefins are selected from the group consisting of ethene, propene, butene, pentene, hexene, heptene, octene, 4-methyl-1-pentene, and combinations thereof.

8. The process of claim 1, or 2 wherein said alpha-olefins are selected from the group consisting of ethene, propene, butene, pentene, hexene, heptene, octene, 4-methyl-1-pentene, and combinations thereof.

9. The process of claim 1, or 2 wherein said alpha-olefins are selected from the group consisting of ethene, propene, butene, pentene, hexene, heptene, octene, and combinations thereof; and the at least one optionally substituted hydrocarbon substituent bonded at a 2° or 3° carbon atom is selected from the group consisting of t-butyl, i-propyl, and a 2° pentyl substituent.

10. The process of claim 1, or 2 wherein said alpha-olefins are selected from the group consisting of ethene, propene, butene, pentene, hexene, heptene, octene, and combinations thereof; and the at least one optionally substituted hydrocarbon substituent bonded at a 2° or 3° carbon atom is selected from the group consisting of t-butyl, i-propyl, and a 2 pentyl substituent; and the metallocene metal is selected from the group consisting of titanium, zirconium, hafnium, and combinations thereof.

11. The process of claim 1, or 2 wherein the metallocene metal is selected from the group consisting of titanium, hafnium, zirconium, and combinations thereof; and said polymerizing occurs in a solution, gas, or slurry phase reactor.

12. The process of claim 1, or 2 wherein the metallocene metal is selected from the group consisting of titanium, hafnium, zirconium, and combinations thereof; said polymerizing occurs in a solution, gas, or slurry phase reactor; and said alpha-olefin is selected from ethene, propene, and butene.

13. The process of claims 1, or 2 wherein the catalyst system comprises a support material.

14. The process of claims 1, or 2 wherein alpha-olefin is selected from: propene, 1-butene, 1-hexene, 1-pentene, 4-methyl-1-pentene, octene, and combinations thereof, and the catalyst system comprises:

(i) metallocene having at least one cyclopentadienyl ring having at least one substituent selected from: t-butyl, i-propyl, 2° pentyl substituents, and combinations thereof; and (ii) methylalumoxane.

15. The process of claims 1, or 2 wherein catalyst system is supported on a support material.

16. A process for polymerizing ethylene optionally with at least one alpha-olefin comonomer in the presence of a catalyst system, said processing comprising:

a) contacting said ethylene optionally with at least one alpha-olefin comonomer with said catalyst system, said catalyst system comprising a transition metallocene of Group IV or V of the Periodic Table of Elements having at least one substituted cyclopentadienyl ring, the substituent of which is a hydrocarbon or substituted hydrocarbon group having 3 to 20 carbon atoms and having a 2° or 3° carbon atom with which it is bonded to said cyclopentadienyl ring and an activator for the metallocene, and b) recovering a polyolefin product having a molecular weight distribution greater than about 4.

17. The process in accordance with claim 1 wherein the polymer has a molecular weight distribution in the range of about 3 to about 30.

18. The process in accordance with claim 1 wherein the polymer has a molecular weight distribution in the range of about 4 to about 20.

* * * * *